United States Patent
Neeli et al.

(10) Patent No.: US 8,740,563 B2
(45) Date of Patent: Jun. 3, 2014

(54) SEALING ASSEMBLY FOR USE IN TURBOMACHINES AND METHODS OF ASSEMBLING SAME

(75) Inventors: Sudhakar Neeli, Bangalore (IN); Joshy John, Bangalore (IN)

(73) Assignee: General Electric Company, Schenectady, NY (US)

( * ) Notice: Subject to any disclaimer, the term of this patent is extended or adjusted under 35 U.S.C. 154(b) by 653 days.

(21) Appl. No.: 12/951,128

(22) Filed: Nov. 22, 2010

(65) Prior Publication Data

US 2012/0126486 A1    May 24, 2012

(51) Int. Cl.
*F04D 29/10* (2006.01)

(52) U.S. Cl.
USPC ........................................ 415/230; 415/171.1

(58) Field of Classification Search
USPC .......... 415/170.1, 171.1, 173.7, 174.2, 174.3, 415/174.5, 230, 229, 173.3; 416/216, 174
See application file for complete search history.

(56) References Cited

U.S. PATENT DOCUMENTS

| | | | | |
|---|---|---|---|---|
| 2,400,028 A | * | 5/1946 | Side | 384/130 |
| 3,474,734 A | * | 10/1969 | Stogner | 415/175 |
| 4,764,085 A | * | 8/1988 | Jesinger | 415/112 |
| 6,056,509 A | * | 5/2000 | Nakayama et al. | 416/128 |
| 6,746,019 B1 | | 6/2004 | Liebenberg et al. | |
| 6,761,530 B1 | * | 7/2004 | Ginessin et al. | 415/173.7 |
| 7,004,475 B2 | | 2/2006 | McHale et al. | |
| 2005/0200080 A1 | | 9/2005 | Baghdadi et al. | |

* cited by examiner

*Primary Examiner* — Nathaniel Wiehe
*Assistant Examiner* — Aaron Jagoda
(74) *Attorney, Agent, or Firm* — Armstrong Teasdale LLP

(57) ABSTRACT

A method of assembling a sealing assembly for use in a turbomachine includes providing a rotatable element that includes an end portion with a plurality of grooves partially extending circumferentially about a portion of an outer surface of the end portion of the rotatable element. The method also includes providing a stationary portion that includes an upper section and a lower section. The method further includes inserting at least a portion of the end portion of the rotatable element into the lower section. The method also includes coupling the upper section to the lower section, thereby defining a rotor shaft cavity. The end portion of the rotatable element at least partially extends through the rotor shaft cavity, thereby defining a clearance between the end portion of the rotatable element and the stationary portion.

19 Claims, 5 Drawing Sheets

US 8,740,563 B2

SEALING ASSEMBLY FOR USE IN TURBOMACHINES AND METHODS OF ASSEMBLING SAME

BACKGROUND OF THE INVENTION

This invention relates generally to turbomachines and, more particularly, to a sealing assembly for use in turbomachines.

Known turbomachines include a defined flow path. For example, at least some known steam turbine engines include at least one of a high pressure (HP) turbine, an intermediate pressure (IP) turbine and/or a low pressure (LP) turbine that, each define a portion of the steam path therein. Known turbomachines also include a rotatable, or rotor shaft extending through such casings. Steam leakage can occur either into or from the steam path, and from areas of higher pressure to areas of lower pressure, wherein such steam leakage is a function of the magnitude of a differential pressure between the two areas. Such leakage may adversely affect the operating efficiency of the turbine. For example, steam-path leakage occurring between the rotor shaft of the turbine and a surrounding turbine casing may reduce the overall efficiency of that turbine. Similarly, steam-path leakage between the rotor shaft and a portion of the casing transiting between adjacent turbine casings may also reduce the overall efficiency of the turbine assembly. Over time, reductions in the operating efficiency of the steam turbine may result in increased fuel costs.

To reduce an amount of flow path leakage, at least some known turbomachines use flow restraining devices, such as seals. Such flow restraining devices generally reduce an overall size of the area that flow can leak through, and thus reduce the amount of steam leakage. For example, labyrinth seals may be positioned between the turbine casings to minimize flow leakage to the atmosphere. At least some known labyrinth seals are formed with a plurality of grooves that circumscribed the rotor shaft. To reduce flow leakage, a clearance between a plurality of stationary seal teeth and the opposing end packing rings is substantially reduced. However, within known turbomachinery, because the flow has a high axial velocity, the flow may "skid" through the grooves and inhibit the effectiveness of such labyrinth seals.

BRIEF DESCRIPTION OF THE INVENTION

In one embodiment, a method of assembling a sealing assembly for use in a turbomachine is provided. The method includes providing a rotatable element that includes an end portion with a plurality of grooves partially extending circumferentially about a portion of an outer surface of the end portion of the rotatable element. The method also includes providing a stationary portion that includes an upper section and a lower section. The method further includes inserting at least a portion of the end portion of the rotatable element into the lower section. The method also includes coupling the upper section to the lower section, thereby defining a rotor shaft cavity. The end portion of the rotatable element at least partially extends through the rotor shaft cavity, thereby defining a clearance between the end portion of the rotatable element and the stationary portion.

In another embodiment, a sealing assembly for use in a turbomachine is provided. The turbomachine includes a rotatable element and a stationary portion. An end portion of the rotatable element extends through at least a portion of a rotor shaft cavity defined by the stationary portion. The sealing assembly includes a sealing element formed across the end portion of the rotatable element. The sealing element defines a plurality of grooves partially extending circumferentially about a portion of an outer surface of the rotatable element.

In a further embodiment, a turbomachine is provided. The turbomachine includes a rotatable element that includes an end portion that defines an outer surface. The turbomachine also includes a stationary portion that at least partially extends about the rotatable element such that the stationary portion and the rotatable element at least partially define a rotor shaft cavity therebetween. The end portion of the rotatable element extends through at least a portion of the rotor shaft cavity. The turbomachine further includes at least one sealing assembly. The sealing assembly includes a sealing element formed across the end portion of the rotatable element. The sealing element defines a plurality of grooves extending circumferentially about a portion of the outer surface of the end portion of the rotatable element.

BRIEF DESCRIPTION OF THE DRAWINGS

The embodiments described herein may be better understood by referring to the following description in conjunction with the accompanying drawings.

DETAILED DESCRIPTION OF THE INVENTION

The exemplary methods, apparatus, and systems described herein overcome at least some of the disadvantages associated with known turbomachines that may operate with fluid leakage from the turbomachine to external atmospheric environments. The embodiments described herein provide a sealing assembly for use in a turbomachine that substantially reduces fluid leakage from the turbomachine, thus facilitating improving turbine performance. More specifically, the sealing assembly described herein is a labyrinth seal that includes a plurality of intermittent seal grooves that are defined on a rotatable element of a turbomachine, such as the rotatable element found on a rotor shaft of a steam turbine engine.

Figure 1:
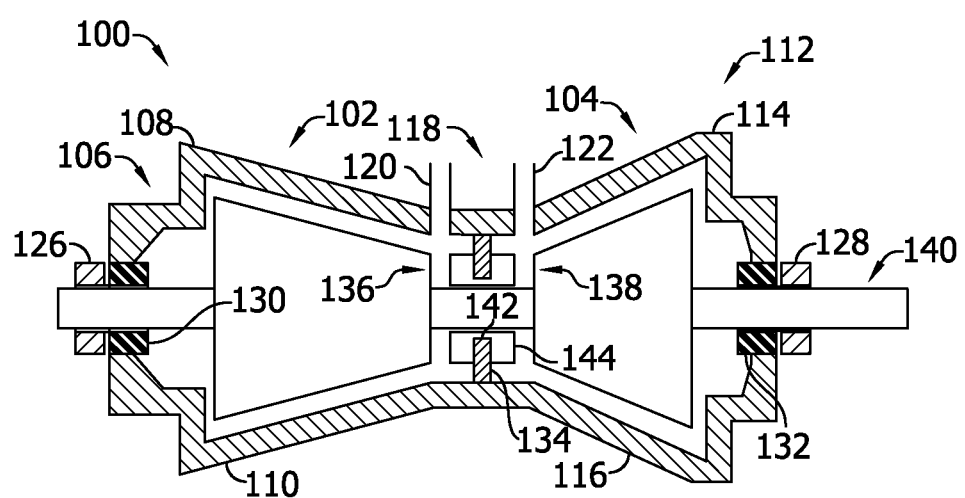
FIG. 1 is a cross-sectional schematic view of an exemplary opposed-flow steam turbine engine.

FIG. 1 illustrates a cross-sectional schematic view of an exemplary opposed-flow steam turbine engine 100 that includes a high pressure (HP) section 102 and an intermediate pressure (IP) section 104. While FIG. 1 describes an exemplary steam turbine engine, it should be noted that the sealing assembly and method described herein is not limited to any one particular turbine engine. One of ordinary skill in the art should appreciate that the current invention may be used with any turbomachine, including a gas turbine engine, in any suitable configuration that enables such an apparatus and method.

In the exemplary embodiment, an HP shell or casing 106 is divided axially into respective upper and lower half sections 108 and 110. Similarly, an IP shell 112 is divided axially into respective upper and lower half sections 114 and 116. In the exemplary embodiment, shells 106 and 112 are inner casings. Alternatively, shells 106 and 112 may be outer casings. A central section 118, extending between HP section 102 and IP section 104 includes a high pressure steam inlet 120 and an intermediate pressure steam inlet 122. Within casings 106 and 112, HP section 102 and IP section 104, respectively, are arranged in a single bearing span that is supported by journal bearings 126 and 128. Also, in the exemplary embodiment, a high pressure (HP) sealing assembly 130 is positioned inboard of journal bearing 126. Similarly, an intermediate pressure (IP) sealing assembly 132 is positioned inboard of journal bearing 128.

An annular section divider 134 extends radially inwardly from central section 118 towards a rotatable element 140. In the exemplary embodiment, rotatable element 140 is a rotor shaft that extends between HP section 102 and IP section 104. More specifically, in the exemplary embodiment, divider 134 circumscribes a portion of rotatable element 140 between a first HP section inlet nozzle 136 and a first IP section inlet nozzle 138. Divider 134 is at least partially inserted in a channel 142 defined in a packing casing 144. In the exemplary embodiment, channel 142 is a C-shaped channel 142 that extends radially into packing casing 144 and around an outer circumference of packing casing 144 such that a center opening (not shown in FIG. 1) of channel 142 faces radially outwardly.

During operation, high pressure steam inlet 120 receives high pressure and high temperature steam from a steam source, such as a power boiler (not shown in FIG. 1). Steam is channeled through HP section 102 from inlet nozzle 136, wherein the steam induces rotation of element 140. In the exemplary embodiment, the steam strikes a plurality of turbine blades or buckets (not shown in FIG. 1) that are coupled to rotatable element 140. In the exemplary embodiment, each set of buckets are located near a sealing assembly (not shown in FIG. 1) that facilitates channeling steam to the associated buckets. The steam exits HP section 102 and is returned to the power boiler wherein it is reheated. Reheated steam is then routed to IP steam inlet 122 and returned to IP section 104 at a lower pressure than steam entering HP section 102, but at a temperature that is approximately equal to the temperature of steam entering HP section 102. Work is extracted from the steam in IP section 104 in a manner substantially similar to that used for HP section 102. Accordingly, an operating pressure within HP section 102 is higher than an operating pressure within IP section 104, such that steam within HP section 102 tends to flow towards IP section 104 through leakage paths defined between HP section 102 and IP section 104. One such leakage path may extend axially along rotatable element 140 through packing casing 144.

In the exemplary embodiment, steam turbine 100 is an opposed-flow HP and IP steam turbine engine. Alternatively, steam turbine 100 may be used with any other turbine including, but not being limited to low pressure turbines. In addition, the present invention is not limited to being used with opposed-flow steam turbines, but rather may be used with any steam turbine configuration including, but not limited to, single-flow and double-flow steam turbine engines. Moreover, as discussed above, the present invention is not limited to only being used in steam turbine engines and can be used in other turbine system, such as gas turbine engines.

Figure 2:
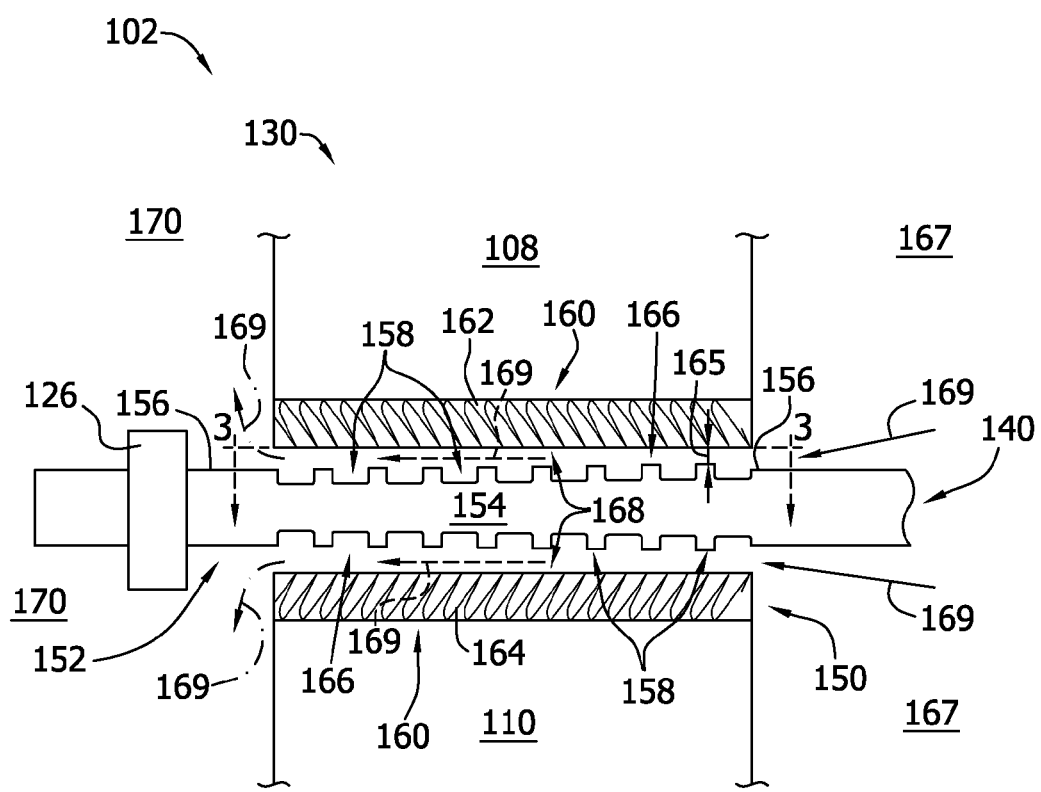
FIG. 2 is a cross-sectional schematic view of a portion of an exemplary high pressure (HP) section that may be used with the steam turbine engine shown in FIG. 1.

FIG. 2 is a cross-sectional schematic view of a portion of HP section 102 that may be used with steam turbine engine 100 (shown in FIG. 1). In the exemplary embodiment, HP section 102 includes upper and lower half sections 108 and 110, respectively, that define a rotor shaft cavity 150 that enables an end portion of rotatable element 140, i.e., a rotor shaft end 152, to be extended therethrough. Rotor shaft end 152, upper half section 108, and lower half section 110 form HP sealing assembly 130. In the exemplary embodiment, sealing assembly 130 includes a first sealing element 154 that extends circumferentially about rotor shaft end 152. More specifically, rotor shaft end 152 defines a radially outer surface 156 and first sealing element 154 includes a plurality of grooves 158 formed on outer surface 156. Moreover, first sealing element 154 is formed unitarily within rotor shaft end 152 and rotates therewith. In some embodiments, radially outer surface 156 is referred to as a "rotor land." First sealing element 154 is described in more detail below.

In the exemplary embodiment, sealing assembly 130 includes a second sealing element 160 that is coupled to upper half section 108 and to lower half section 110. More specifically, second sealing element 160 includes a first portion 162 that is coupled to upper half section 108 and a second portion 164 that is coupled to lower half section 110. Second sealing element 160 extends substantially concentrically about first sealing element 154 such that a clearance 165 is defined between first sealing element 154 and second sealing element 160. As such, a narrow, substantially annular fluid flow path 166 is defined between first sealing element 154 and second sealing element 160.

Further, in the exemplary embodiment, second sealing element 160 includes a plurality of slanted teeth 168. Alternatively, second sealing element 160 may include any protrusions that enable operation of sealing assembly 130 as described herein including, without limitation, substantially straight teeth. Moreover, in the exemplary embodiment, first portion 162 and second portion 164 are substantially similar and symmetrical such that when upper half section 108 and lower half section 110 are coupled to each other, slanted teeth 168 are arranged substantially circularly and extends substantially concentrically about first sealing element 154.

In the exemplary embodiment, upper half section 108 and lower half section 110 define a fluid space 167 within HP section 102. The working fluid typically used in HP section 102 of steam engine 100 (shown in FIG. 1) is HP steam, and therefore, fluid space 167 is referred to herein as steam space 167 and fluid flow path 166 is referred to as steam flow path 166. Arrows 169 illustrate a direction of steam flow as it is channeled through fluid flow path 166 to low pressure environment 170. In some embodiments, low pressure environment 170 is at approximately atmospheric pressure.

Figure 3:
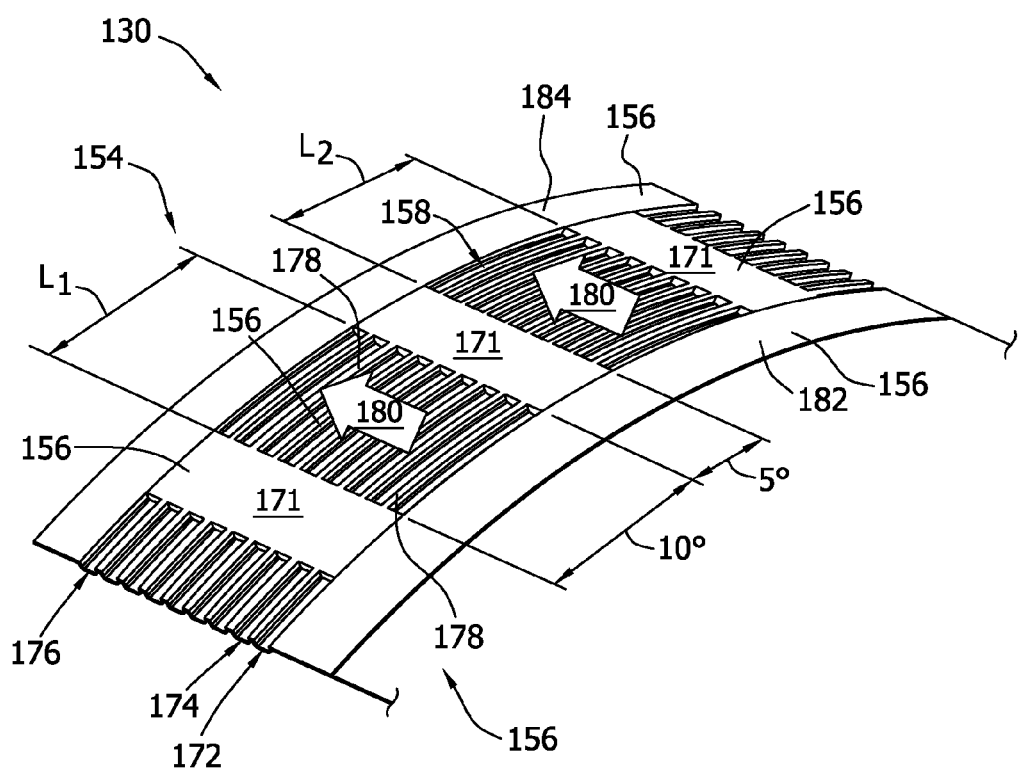
FIG. 3 is a perspective view of a portion of a sealing assembly that may be used with the HP section shown in FIG. 2 and taken along line 3-3.

FIG. 3 is a perspective view of a portion of sealing assembly 130 taken along line 3-3 (shown in FIG. 2). Specifically, FIG. 3 illustrates a portion of first sealing element 154 that extends circumferentially about radially outer surface 156 of rotor shaft end 152 (shown in FIG. 2). As shown in FIG. 3, in the exemplary embodiment, grooves 158 are intermittently defined on rotor shaft end 152.

In the exemplary embodiment, a first groove 158, having a first predetermined length $L_1$, is machined into a portion of radially outer surface 156 of rotor shaft end 152. Also, in the exemplary embodiment, a second groove 158, having a second predetermined length $L_2$, is machined into a portion of radially outer surface 156. The first predetermined length $L_1$ and second predetermined length $L_2$ may be the same length or may be different lengths.

In the exemplary embodiment, each groove 158 has a circumferential length of approximately 10° and is separated from each radially adjacent groove 158 by a first inter-groove portion 171 of radially outer surface 156 that has a length of approximately 5°. As such, in the exemplary embodiment, first sealing element 154 includes twenty-four grooves 158 and twenty-four first inter-groove portions 171 that extend in a first circumferential row 172, a second circumferential row 174, and similarly to an $n^{th}$ circumferential row 176. More specifically, in the exemplary embodiment, n=9 and each circumferential row 172 through 176 is substantially similar. Moreover, in the exemplary embodiment, rows 172 and 174 through row 176 are substantially parallel to each other. Alternatively, radially outer surface 156 may be formed with any number of rows 172 through 176, with any number of grooves 158, and/or with any number of inter-groove portions 171 formed that enables operation of sealing assembly 130 as described herein.

Also, in the exemplary embodiment, grooves 158 are formed with an intermittent milling process. During an intermittent milling process, no rotor shaft material is removed for a continuous groove as is typical for steam turbine fabrication and assembly. Rather, in such a milling process, rotor shaft material is removed intermittently to define grooves 158. Alternatively, any other milling and/or machining process that enables grooves 158 to be defined as described herein may be used.

Further, in the exemplary embodiment, circumferential rows 172 through 176 define a plurality of axially adjacent grooves 158 within a second inter-groove portion 178 of radially outer surface 156. More specifically, in the exemplary embodiment, rows 172 through 176 each have a value for lengths $L_1$ and $L_2$ of approximately 10°. Axially adjacent grooves 158 and second inter-groove portions 178 define an axial groove fluid flow path 180. Moreover, in the exemplary embodiment, circumferential rows 172 through 176 define a substantially axially continuous first inter-groove portion 171 that separates each axially adjacent groove fluid flow path 180.

Also, in the exemplary embodiment, first sealing element 154 includes an upstream circumferential band 182 and a downstream circumferential band 184. More specifically, in the exemplary embodiment, bands 182 and 184 are each defined by radially outer surface 156.

Figure 4:
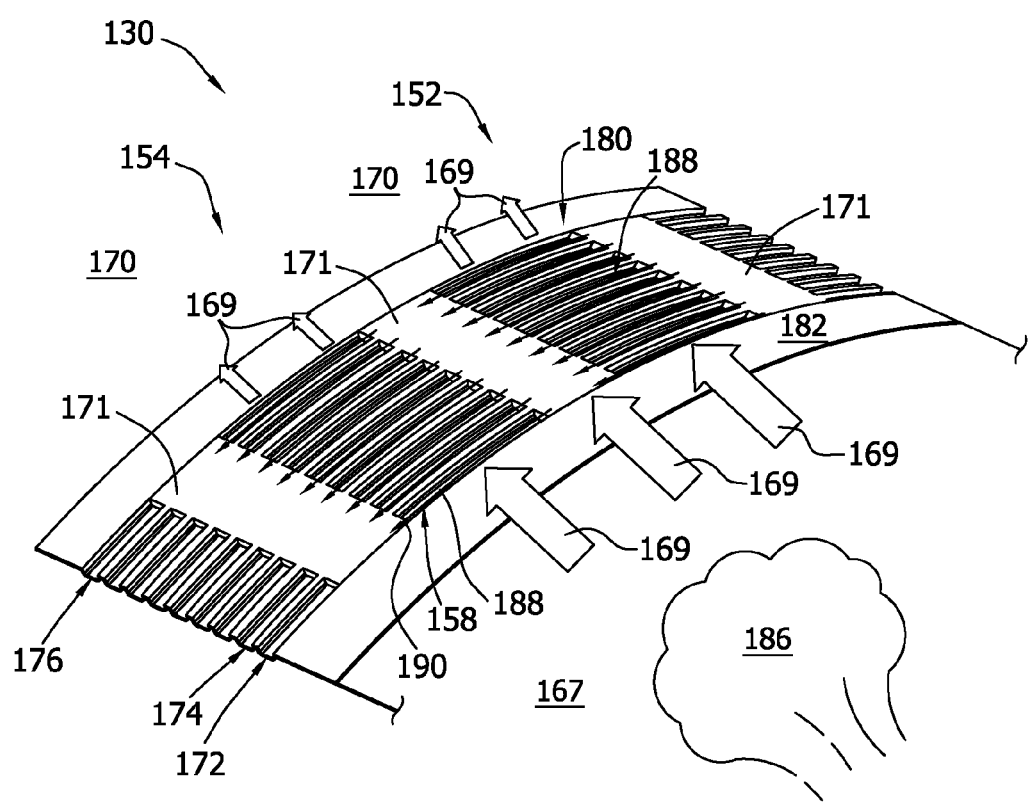
FIG. 4 is a perspective view of the portion of the sealing assembly shown in FIG. 3.

FIG. 4 is a perspective view of first sealing element 154. In the exemplary embodiment, during operation of steam turbine engine 100 (shown in FIG. 1), high pressure steam 186 is channeled into steam space 167. High pressure steam 186 pressurizes steam space 167 and induces rotation of rotor shaft end 152. Moreover, during operation, steam flow 169 from steam space 167 to low pressure environment 170 may occur.

In operation, after injection of steam 186 into steam space 167, steam 186 is channeled towards first sealing element 154 as illustrated by steam flow arrows 169. Steam flow 169 is channeled into steam flow path 166 between band 182 and slanted teeth 168 (shown in FIG. 2), wherein steam flow 169 "skids" across upstream circumferential band 182. Steam flow 169 is channeled into first circumferential row 172 of grooves 158. Grooves 158 entrap at least a portion of steam flow 169, thereby inducing turbulence 188 therein. Such turbulence 188 reduces kinetic energy within steam flow 169, and thereby decreases a potential for steam flow 169 to continue to travel axially towards second circumferential row 174. Also, trapped steam 169 within grooves 158 increases a resistance to steam flow 169, thereby inducing the formation of a pressure barrier that further decreases steam flow 169. Further, rotation of rotor shaft end 152 induces tangential momentum into steam trapped in grooves 158 that facilitates steam exiting grooves 158 towards first inter-groove portion 171, thereby forming a tangential steam flow 190. Tangential steam flow 190 reduces axial steam flow 169 across first inter-groove portion 171. Moreover, the relatively small clearance 165 defined between slanted teeth 168 and first sealing element 154 also restricts axial steam flow 169.

Subsequent circumferential rows 174 through 176 further decrease axial steam flow 169 as described above through each axially adjacent groove fluid flow path 180, thereby significantly reducing an axial velocity of the steam and reducing a potential for steam to "skid" through sealing assembly 130 along first sealing element 154. Steam flow 169 entering sealing assembly 130 is substantially reduced as circumferential rows 172 through 176 operate as described above. As a result, steam flow 169 leaking to the low pressure environment 170 is facilitated to be reduced as compared to the steam flow 169 initially entering sealing assembly 130. Moreover, steam flow 169 transiting sealing assembly 130 during steady-state operation of sealing assembly 130 is facilitated to be reduced as compared to known labyrinth seals. Such reduction of steam flow 169 facilitates an improvement in an overall efficiency of steam turbine engine 100 (shown in FIG. 1), thereby facilitating a decrease in associated fuel costs.

While the exemplary embodiment describes operation of sealing assembly 130 for a high pressure turbine, operation of sealing assembly 130 in intermediate turbines, for example, sealing assembly 132 (shown in FIG. 1), and low pressure turbines will be substantially similar.

Figure 5:
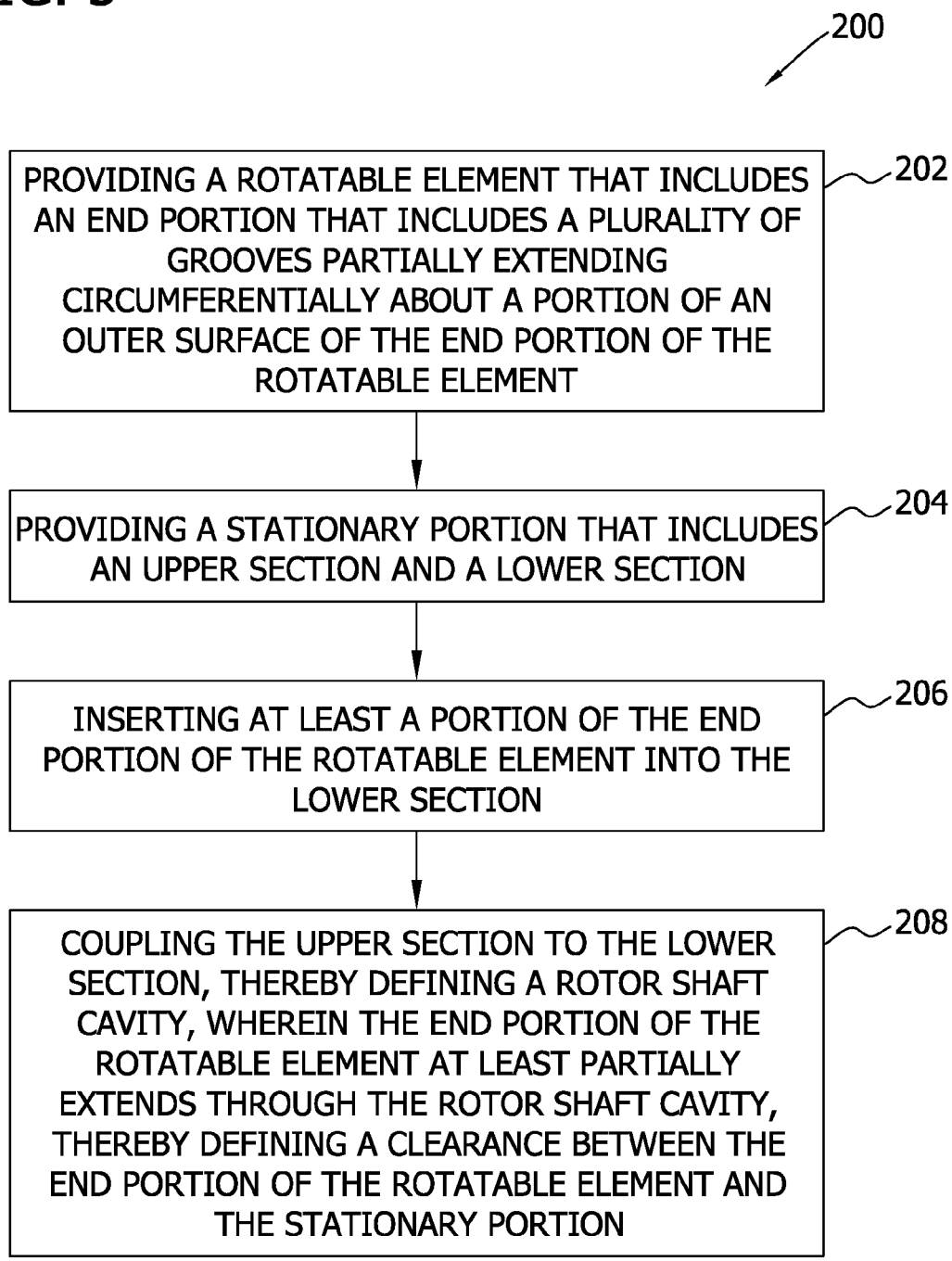
FIG. 5 is a flow chart illustrating an exemplary method that may be used in assembling the sealing assembly shown in FIGS. 3 and 4.

FIG. 5 is a flow chart illustrating an exemplary method 200 for assembling a sealing assembly such as sealing assembly 130 (shown in FIGS. 1-4) for use in a turbomachine, such as steam turbine engine 100 (shown in FIG. 1). In the exemplary embodiment, initially, a rotatable element 140 is provided 202. Rotatable element 140 includes an end portion such as rotor shaft end 152 (both shown in FIG. 2). Also, in the exemplary embodiment, a plurality of grooves 158 (shown in FIGs. and 3) partially extend circumferentially about a portion of an outer surface 156 of rotor shaft end 152 (both shown in FIG. 2) of rotatable element 140. Further, a stationary portion, such as HP shell 106 (shown in FIG. 1), is provided 204. HP shell 106 includes an upper section, such as HP upper half section 108, and a lower section, such as HP lower half section 110 (both shown in FIGS. 1 and 2). Moreover, in the exemplary embodiment, at least a portion of rotor shaft end 152 of rotatable element 140 is inserted 206 into HP lower half section 110. Also, in the exemplary embodiment, HP upper half section 108 is coupled 208 to HP lower half section 110, thereby defining a rotor shaft cavity 150 (shown in FIG. 2), wherein rotor shaft end 152 of rotatable element 140 at least partially extends through rotor shaft cavity 150, thereby defining a clearance between rotor shaft end 152 of rotatable element 140 and HP shell 106.

Embodiments provided herein facilitate enhancing the operation of turbomachines and provide a more robust turbomachine seal assembly configuration as compared to known seal assemblies. Specifically, the exemplary embodiments described herein overcome disadvantages associated with known turbomachines that may operate with fluid leakage from the turbomachine to external atmospheric environments. More specifically, the embodiments described herein provide a sealing assembly for use in a turbomachine that substantially reduces fluid leakage from the turbomachine, which in turn, improves turbine performance.

Described above are exemplary embodiments of methods and apparatus that facilitate the assembly and operation of steam turbine engines. Specifically, the embodiments described herein provide a more robust turbomachine seal assembly configuration than most know labyrinth-type sealing devices. More specifically, the sealing assemblies described herein use a labyrinth seal assembly that includes a plurality of intermittent seal grooves defined on a rotatable element of a turbomachine, such as the rotatable element found on a rotor shaft of a steam turbine engine. Also, more specifically, the intermittent seal grooves described herein facilitate substantially reducing fluid leakage from the turbomachine by forming pressure barriers that facilitate translating axial flow to tangential flow within the sealing assembly. Furthermore, a plurality of slanted teeth that extend circumferentially about the intermittent seal grooves further restrict steam flow therethrough. The intermittent seal grooves disrupt flow that would skid along a surface of the rotatable element. As such, flow leakage is substantially reduced. In addition, the seal assemblies described herein facilitate improving efficiency of the turbomachine and reducing operating costs.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other systems and methods.

While the invention has been described in terms of various specific embodiments, those skilled in the art will recognize that the invention can be practiced with modification within the spirit and scope of the claims.

What is claimed is:

1. A method of assembling a sealing assembly for use in a turbomachine, said method comprising:
    providing a rotatable element that rotates about an axis of rotation and includes an end portion including a first groove and a second groove formed therein, each of the first groove and the second groove partially extending circumferentially about a portion of an outer surface of the end portion of the rotatable element such that each of the first groove and the second groove is arcuate and is substantially perpendicular to the axis of rotation, the first groove being separated from the second groove by a portion of the outer surface of the rotatable element;
    providing a stationary portion that includes an upper section and a lower section;
    inserting at least a portion of the end portion of the rotatable element into the lower section; and
    coupling the upper section to the lower section, thereby defining a rotor shaft cavity, wherein the end portion of the rotatable element at least partially extends through the rotor shaft cavity, thereby defining a clearance between the end portion of the rotatable element and the stationary portion.

2. A method in accordance with claim 1, wherein providing a rotatable element comprises providing a rotatable element wherein the first groove that is segmented and a second groove partially extending circumferentially about a portion of an outer surface of the end portion of the rotatable element define a first circumferential row of grooves.

3. A method in accordance with claim 2 wherein providing a rotatable element further comprises providing a rotatable element with a second circumferential row of grooves that is substantially similar to and parallel to the first circumferential row of grooves.

4. A method in accordance with claim 3, wherein providing a rotatable element with a second circumferential row of grooves comprises providing a rotatable element wherein the first circumferential row of grooves and the second circumferential of grooves are aligned such that an axial groove path is defined on a portion of the rotatable element.

5. A method in accordance with claim 1, wherein providing a rotatable element that rotates about an axis of rotation and includes an end portion including a first groove and a second groove formed therein comprises providing a first sealing element, said method further comprising:
    coupling a second sealing element to a portion of the stationary portion of the turbomachine; and
    concentrically extending at least a portion of the second sealing element about at least a portion of the first sealing element.

6. A method in accordance with claim 5, wherein concentrically extending at least a portion of the second sealing element about at least a portion of the first sealing element comprises assembling a labyrinth seal that defines an axial fluid flow path within the clearance defined between the end portion of the rotatable element and the stationary portion, the axial fluid flow path facilitates restricting fluid flow through the clearance.

7. A sealing assembly for use in a turbomachine, the turbomachine includes a rotatable element that rotates about an axis of rotation and a stationary portion, an end portion of the rotatable element extends through at least a portion of a rotor shaft cavity defined by the stationary portion, said sealing assembly comprising a sealing element formed in the end portion of the rotatable element, said sealing element comprising a first groove and a second groove partially extending circumferentially about a portion of an outer surface of the rotatable element such that each of the first groove and the second groove is arcuate and is substantially perpendicular to the axis of rotation, the first groove being separated from the second groove by a portion of the outer surface of the rotatable element.

8. A sealing assembly in accordance with claim 7, wherein said sealing element defines a first circumferential row of grooves.

9. A sealing assembly in accordance with claim 8, wherein said sealing element further defines a second circumferential row of grooves that is substantially similar to and parallel to said first circumferential row of grooves.

10. A sealing assembly in accordance with claim 9, wherein a respective groove of said first circumferential row of grooves and a respective groove of said second circumferential row of grooves are substantially adjacent to each other, thereby defining an axial groove path.

11. A sealing assembly in accordance with claim 7, wherein said sealing element further comprises:
    an upstream circumferential band defined by a portion of the rotatable element; and
    a downstream circumferential band defined by a portion of the rotatable element.

12. A sealing assembly in accordance with claim 7, wherein said sealing element is a first sealing element, said sealing assembly further comprising a second sealing element coupled to the stationary portion of the turbomachine and concentrically extending about at least a portion of said first sealing element.

13. A sealing element in accordance with claim 12, wherein said second sealing element comprises a plurality of slanted teeth.

14. A turbomachine comprising:
    a rotatable element that rotates about an axis of rotation, said rotatable element comprising an end portion, said end portion defines an outer surface;
    a stationary portion that at least partially extends about said rotatable element such that said stationary portion and said rotatable element at least partially define a rotor shaft cavity therebetween, said end portion of said rotatable element extends through at least a portion of said rotor shaft cavity; and at least one sealing assembly comprising a sealing element formed in said end portion of said rotatable element, said sealing element comprising a first groove and a second groove partially extending circumferentially about a portion of said outer surface of said end portion of said rotatable element such that each of the first groove and the second groove is arcuate and is substantially perpendicular to the axis of rotation, the first groove being separated from the second groove by a portion of the outer surface of the rotatable element.

15. A turbomachine in accordance with claim 14, wherein said sealing element defines a first circumferential row of grooves.

16. A turbomachine in accordance with claim 15, wherein said sealing element further defines a second circumferential row of grooves that is substantially similar to and parallel to said first circumferential row of grooves.

17. A turbomachine in accordance with claim 16, wherein a respective groove of said first circumferential row of grooves and a respective groove of said second circumferential row of grooves are substantially adjacent to each other, thereby defining an axial groove path.

18. A turbomachine in accordance with claim 14, wherein said sealing element is a first sealing element, said sealing assembly further comprising a second sealing element coupled to said stationary portion of said turbomachine and concentrically extending about at least a portion of said first sealing element.

19. A turbomachine in accordance with claim 18, wherein said second sealing element comprises a plurality of slanted teeth.

* * * * *